United States Patent
Shim et al.

(10) Patent No.: US 8,842,360 B2
(45) Date of Patent: Sep. 23, 2014

(54) ELECTROWETTING DISPLAY DEVICE

(71) Applicant: Liquavista B.V., Eindhoven (NL)

(72) Inventors: SeungBo Shim, Asan-si (KR); Sungkyun Park, Seoul (KR); Yong Jun Park, Yongin-si (KR); Hyun Sup Lee, Suwon-si (KR); Jinho Ju, Seoul (KR)

(73) Assignee: Liquavista B.V., Eindhoven (NL)

( * ) Notice: Subject to any disclaimer, the term of this patent is extended or adjusted under 35 U.S.C. 154(b) by 58 days.

(21) Appl. No.: 13/757,608

(22) Filed: Feb. 1, 2013

(65) Prior Publication Data

US 2013/0342890 A1     Dec. 26, 2013

(30) Foreign Application Priority Data

Jun. 20, 2012   (KR) .......................... 10-2012-0066245

(51) Int. Cl.
 *G02B 26/00* (2006.01)
 *G02B 26/02* (2006.01)
 *G09G 3/34* (2006.01)

(52) U.S. Cl.
 CPC .............. *G02B 26/005* (2013.01); *G09G 3/348* (2013.01)
 USPC ............. 359/295; 359/290; 359/228; 345/55; 345/61; 345/204; 345/690

(58) Field of Classification Search
 CPC .... G02B 26/00; G02B 26/004; G02B 26/005; G02B 26/02; G09G 3/3433; G09G 3/348
 USPC ................. 359/290–295, 228, 245, 253, 254; 345/55, 61, 87, 88, 104, 107, 204, 211, 345/690
 See application file for complete search history.

(56) References Cited

U.S. PATENT DOCUMENTS

| | | | |
|---|---|---|---|
| 7,687,998 B2 | 3/2010 | Park et al. | |
| 8,059,328 B1* | 11/2011 | Kuo et al. | 359/290 |
| 8,363,040 B2* | 1/2013 | Matsuoka et al. | 345/206 |
| 8,508,467 B2* | 8/2013 | Teranishi et al. | 345/107 |
| 8,698,715 B2* | 4/2014 | Nakano et al. | 345/87 |
| 2009/0161047 A1 | 6/2009 | Cho et al. | |
| 2011/0187682 A1 | 8/2011 | Kim et al. | |
| 2011/0221731 A1 | 9/2011 | Tae et al. | |
| 2013/0342889 A1* | 12/2013 | Kim et al. | 359/290 |
| 2014/0029080 A1* | 1/2014 | Hwang | 359/290 |

FOREIGN PATENT DOCUMENTS

| | | |
|---|---|---|
| JP | 2003-045355 A | 2/2003 |
| KR | 10-2001-0056347 A | 7/2001 |
| KR | 10-2004-0013497 A | 2/2004 |
| KR | 10-2005-0008284 A | 1/2005 |

(Continued)

*Primary Examiner* — Loha Ben

(74) *Attorney, Agent, or Firm* — Lee & Hayes, PLLC

(57) ABSTRACT

An electrowetting display device includes a black matrix that includes a plurality of openings corresponding to pixels, respectively, a first extension portion extending in a driving direction of an electrowetting layer, the driving direction being a direction in which motion of the electrowetting layer is induced when a voltage difference is applied between a common electrode and a pixel electrode, and a partition wall that partitions the pixels. The first extension portion includes first and second areas respectively extending in opposite directions to each other and a third area having a width substantially the same as a width of the partition wall. The first area has a width less than about half of a first length corresponding to a length extending between both sides of each pixel in the driving direction, and the second area has a width less than the width of the first area.

20 Claims, 11 Drawing Sheets

(56) References Cited

FOREIGN PATENT DOCUMENTS

| KR | 10-2006-0119447 A | 11/2006 |
|---|---|---|
| KR | 10-2008-0011563 A | 2/2008 |
| KR | 10-2008-0058908 A | 6/2008 |
| KR | 10-2011-0011026 A | 2/2011 |
| KR | 10-2011-0105612 A | 9/2011 |
| KR | 10-2011-0123044 A | 11/2011 |
| KR | 10-2011-0132724 A | 12/2011 |

* cited by examiner

ELECTROWETTING DISPLAY DEVICE

CROSS-REFERENCE TO RELATED APPLICATION

This U.S. non-provisional patent application claims priority under 35 U.S.C. §119 to Korean Patent Application No. 10-2012-0066245, filed on Jun. 20, 2012, the contents of which are hereby incorporated by reference.

BACKGROUND

1. Field of Disclosure

Embodiments of the present disclosure relate generally to flat panel display devices. More particularly, embodiments of the present disclosure relate to an electrowetting display device having improved driving speed.

2. Description of the Related Art

Contemporary flat panel displays can employ various technologies. Examples of these various display devices are a liquid crystal display device, an organic light emitting display device, an electrowetting display device, a plasma display panel, an electrophoretic display device, etc.

Among them, the electrowetting display device has been spotlighted as a next generation display device since it has certain desirable properties, e.g., fast response speed, low driving voltage, low thickness, etc., when compared to the liquid crystal display device. The electrowetting display device utilizes a basic principle that water and oil do not mix.

The electrowetting display device typically includes first and second substrates facing each other, and an electrowetting layer disposed between the first and second substrates. The first substrate includes pixel electrodes respectively corresponding to pixels. The second substrate includes a common electrode and a black matrix. According to voltages applied to the pixel electrodes and the common electrode, a movement of the electrowetting layer is controlled, so desired images are displayed on the electrowetting display.

SUMMARY

The present disclosure provides an electrowetting display device having improved driving speed.

Embodiments of the inventive concept provide an electrowetting display device that includes a first base substrate that includes a plurality of pixels, a second base substrate that faces the first base substrate and includes a common electrode, an electrowetting layer disposed between the first base substrate and the second base substrate, a plurality of pixel electrodes disposed on the first base substrate to respectively correspond to the pixels, and a black matrix. The black matrix includes a plurality of openings corresponding to respective ones of the pixels, the black matrix having a first extension portion extending in a driving direction of the electrowetting layer, the driving direction being a direction in which motion of the electrowetting layer is induced when a voltage difference is applied between the common electrode and the corresponding pixel electrode, and extending in a second direction substantially perpendicular to the driving direction. The first extension portion includes a first area, a second area, and a third area. The first area and the second area respectively extend in opposite directions to each other, the third area has a width substantially the same as a width of the partition wall, the first area has a width less than about half of a first length corresponding to a length extending between both sides of each pixel in the driving direction of the electrowetting layer, and the second area has a width less than the width of the first area.

The black matrix can further comprise a second extension portion extending between adjacent ones of the first extension portions, the first extension portion can have a width greater than a width of the second extension portion, and the third area can overlaps the partition wall.

The partition wall can be disposed on the black matrix, can include a same material as the black matrix, and can have a black color.

The electrowetting display device can further include an insulating layer disposed on the first base substrate to cover the pixel electrodes and a hydrophobic layer disposed in the openings, and the black matrix and the hydrophobic layer can both be disposed on the insulating layer.

The electrowetting layer can include a first fluid that has electrical non-conductivity or non-polarity and a second fluid immiscible with the first fluid and having electrical conductivity or polarity. The first fluid can be accommodated in a space defined by the partition wall, and the second fluid can be disposed on the first fluid.

When a common voltage is applied to the common electrode and one or more gray-scale voltages are applied to the pixel electrodes, the second fluid can contacts the hydrophobic layer and the first areas so as to push the first fluid to a side portion of the pixels.

The second area can extends under an area in which the first fluid is gathered, so as to overlap the first fluid.

Embodiments of the inventive concept provide an electrowetting display device that includes a first base substrate that includes a plurality of pixels, a second base substrate that faces the first base substrate and includes a common electrode, an electrowetting layer disposed between the first base substrate and the second base substrate, a plurality of pixel electrodes disposed on the first base substrate to respectively correspond to the pixels, and a black matrix. The black matrix is disposed between the common electrode and the second base substrate and including a plurality of openings corresponding to respective ones of the pixels, the black matrix having a first extension portion extending in a driving direction of the electrowetting layer, the driving direction being a direction in which motion of the electrowetting layer is induced when a voltage difference is applied between the common electrode and the corresponding pixel electrode, and extending in a second direction substantially perpendicular to the driving direction. The first extension portion includes a first area, a second area, and a third area. The first area and the second area respectively extend in opposite directions to each other, the third area has a width substantially the same as a width of the partition wall, the first area has a width less than about half of a first length corresponding to a length extending between both sides of each pixel in the driving direction of the electrowetting layer, and the second area has a width less than the width of the first area.

According to the above, the electrowetting display device may have improved driving speed.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION

Hereinafter, the present invention will be explained in detail with reference to the accompanying drawings.

Figure 1:
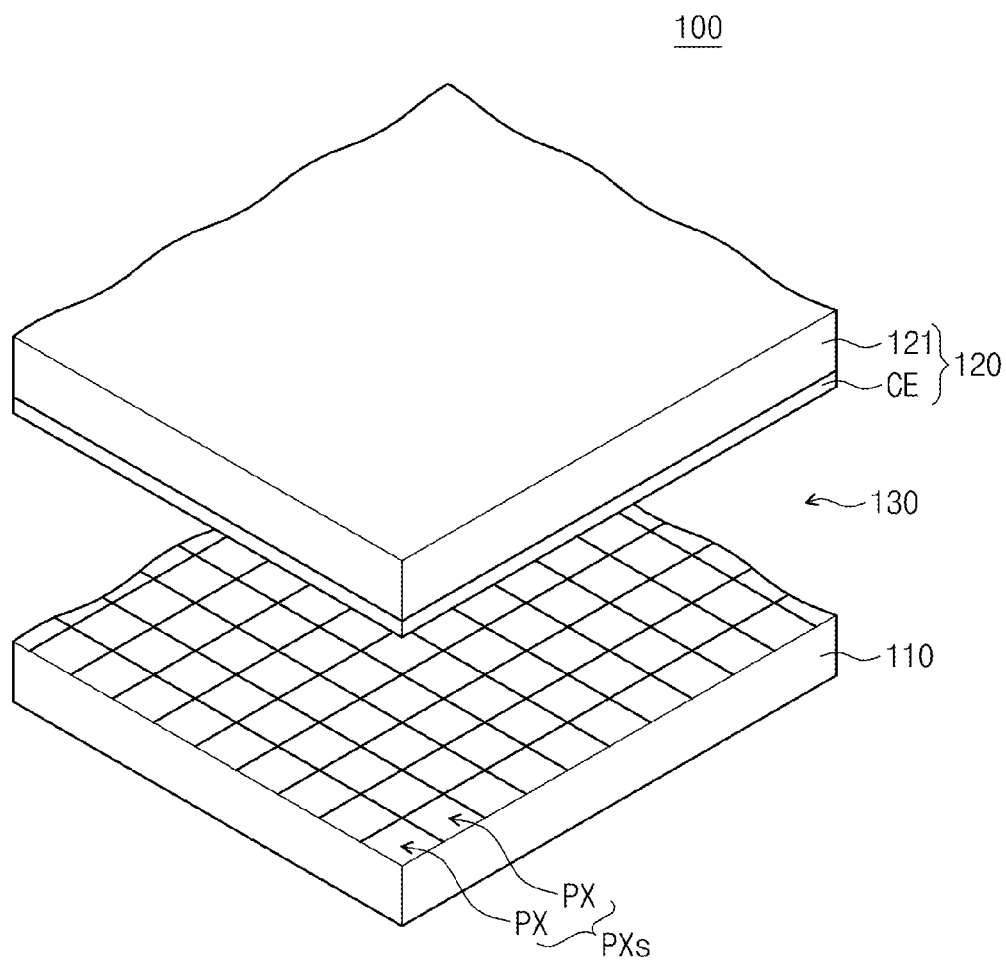
FIG. 1 is a perspective view showing an electrowetting display device according to a first exemplary embodiment of the present invention.

FIG. 1 is a perspective view showing an electrowetting display device according to a first exemplary embodiment of the present invention.

Referring to FIG. 1, an electrowetting display device 100 includes a first substrate 110 in which a plurality of pixels PXs is defined in a matrix form, a second substrate 120 facing the first substrate 110, and an electrowetting layer 130 interposed between the first substrate 110 and the second substrate 120. Hereinafter, one pixel is indicated by PX and two or more pixels are indicated by PXs.

The pixels PXs are arranged in n rows by m columns. Here, n and m are integer numbers greater than zero (0). The pixels PXs are configured to include red, green, and blue pixels. The red, green, and blue pixels are regularly and repeatedly arranged in a row direction and a column direction, but the arrangement of the pixels PXs should not be limited thereto or thereby. Embodiments of the invention contemplate any combinations and arrangements of any colored pixels.

Figure 2:
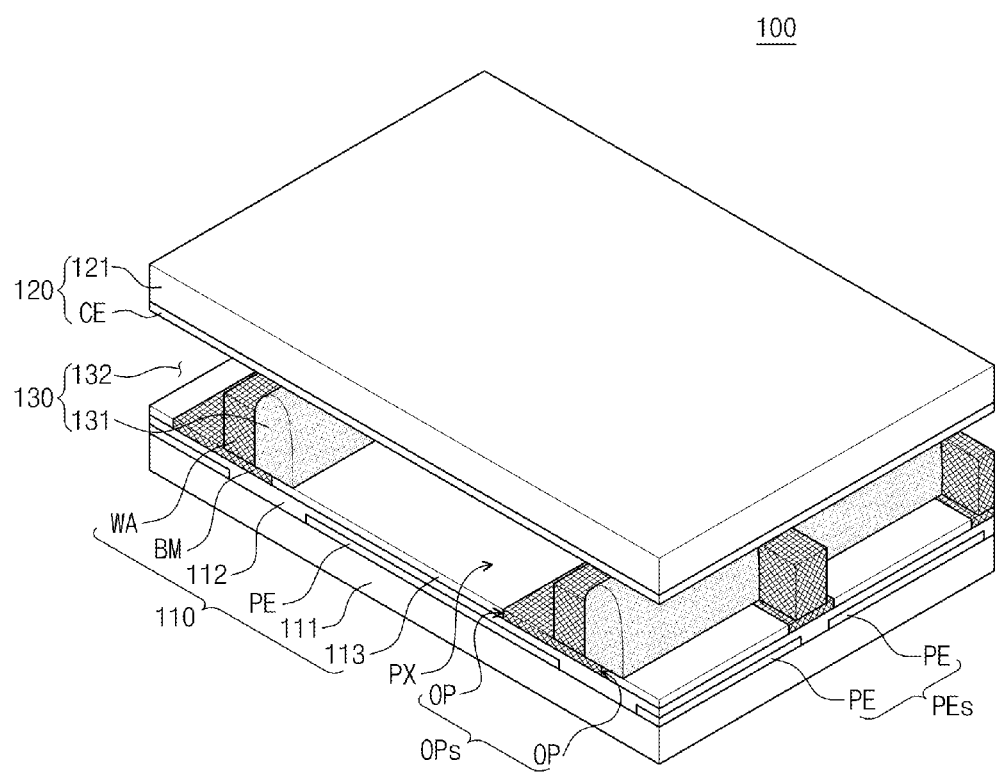
FIG. 2 is an enlarged perspective view showing a portion of the electrowetting display device shown in FIG. 1.

FIG. 2 is an enlarged perspective view showing a portion of the electrowetting display device shown in FIG. 1.

Referring to FIG. 2, the first base substrate 110 includes a first base substrate 111, a plurality of pixel electrodes PEs, an insulating layer 112, a black matrix BM, a hydrophobic layer 113, and a partition wall WA. Hereinafter, one pixel electrode is indicated by PE and two or more pixel electrodes are indicated by PEs.

The first base substrate 111 may be a transparent insulator and formed of a polymer, e.g., glass or plastic. In the case that the first base substrate 111 is a plastic substrate, the first base substrate 111 can be configured to include polyethylene terephthalate (PET), fiber reinforced plastic (FRP), or polyethylene naphthalate (PEN).

The pixel electrodes PEs are disposed on the first base substrate 111. The pixel electrodes PEs respectively correspond to the pixels PXs and are applied with gray-scale voltages.

The pixel electrodes PEs include a transparent conductive material, such as indium tin oxide (ITO), conductive polymer, carbon nanotube (CNT), etc.

The insulating layer 112 is disposed on the first base substrate 111 to cover the pixel electrodes PEs.

The black matrix BM is disposed on the insulating layer 112. The black matrix BM has a lattice shape and includes openings OPs corresponding to the pixels PXs, respectively. Hereinafter, one opening is indicated by OP and two or more openings are indicated by OPs.

The black matrix BM is extended in the driving direction of the electrowetting layer 130. The configuration and function of the black matrix BM will be described in detail below with reference to FIGS. 3A and 3B. The black matrix BM prevents light leaking through a boundary area between adjacent pixels PXs when the pixels PXs are driven.

The hydrophobic layer 113 has hydrophobicity and is disposed on the insulating layer 112. The hydrophobic layer 113 is disposed in the openings OPs of the black matrix BM.

The partition wall WA partitions the pixels PXs and is disposed on the black matrix BM. The partition wall WA at least partially overlaps the black matrix BM. The partition wall WA may be formed of the same material as the black matrix BM, so that the partition wall WA has a black color. That is, the partition wall WA and the black matrix BM are formed of the same organic material and have a black color.

The second substrate 120 includes a second base substrate 121 facing the first base substrate 111 and a common electrode CE disposed on the second base substrate 121.

The second base substrate 121 can be formed of the same material as the first base substrate 111, though it can also be formed of any other suitable material. When each of the first and second base substrates 111 and 121 is a plastic substrate, the first and second base substrates 111 and 121 may be flexible.

The common electrode CE is applied with a common voltage. The common electrode CE includes a transparent conductive material, e.g., indium tin oxide.

Although not shown in FIG. 2, the first substrate 110 or the second substrate 120 may include color filters, each of which has a color pixel that represents one of red, green, and blue (as well as any other) colors.

The electrowetting layer 130 includes a first fluid 131 and a second fluid 132, which are immiscible with each other. The first fluid 131 has electrical non-conductivity or a non-polarity and the second fluid 132 has electrical conductivity or a polarity. In addition, the first fluid 131 has hydrophobicity and the second fluid 132 has hydrophilicity. As examples, the first fluid 131 may include an organic solvent, such as silicon oil, mineral oil, carbon tetrachloride ($CCL_4$), etc. The second fluid 132 may include an aqueous solution and electrolyte, such as sodium chloride (NaCl).

The first fluid 131 includes a black dye or a material absorbing light, to absorb the light incident thereto. In addition, the first fluid 131 is dispersed over each pixel PX in a reset driving operation, or moves to a side portion of each pixel PX when it is applied with the gray-scale voltage so as to serve as a light shutter. The second fluid 132 may be transparent, and thus the second fluid 132 may transmit the light incident thereto.

As an exemplary embodiment, the first fluid 131 includes a dye representing one of red, green, and blue colors or a material representing one of red, green, and blue colors. In this case, the color filter may be removed from the electrowetting display device 100.

The movement of the electrowetting layer 130 is controlled by the gray-scale voltages respectively applied to the pixel electrodes PEs and the common voltage applied to the common electrode CE, thereby displaying desired images. The operation of the pixels PXs will be described in detail later with reference to FIGS. 3A to 5B.

FIG. 2 shows the configuration of an electrowetting display device used as a transmission type display device. However, the electrowetting display device may be used as a reflection type display device. Although not shown in the figures, in a case that the electrowetting display device 100 is used as a reflection type display device, the electrowetting display device 100 may further include a reflective layer configured to include a reflective metal, e.g., aluminum and/or aluminum-neodymium. The reflective layer is disposed on the pixel electrodes PEs or under the first substrate 111.

Alternatively, the pixel electrode 112 may be configured to include reflective metal, e.g., aluminum, to reflect light instead of the reflective layer of the electrowetting display device 100.

Figure 3A:
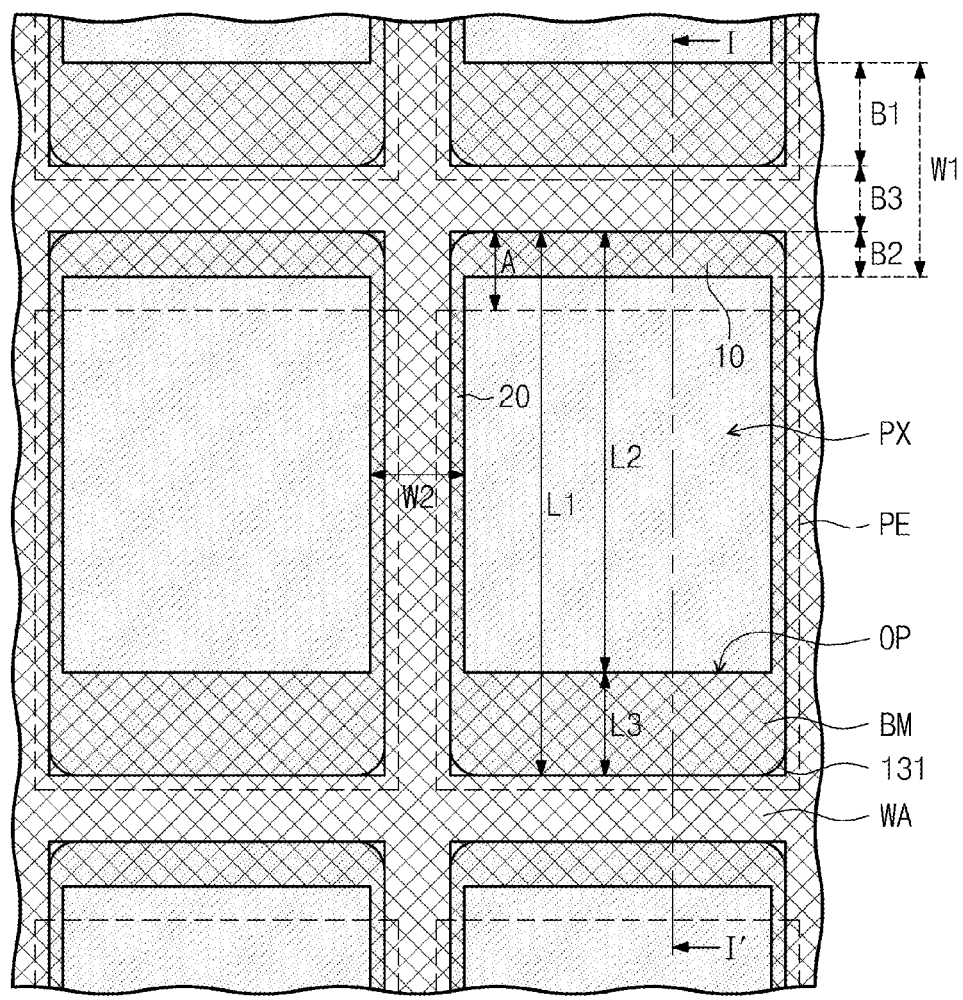
FIG. 3A is a plan view showing a reset state of a pixel of the electrowetting display device shown in FIG. 1.
Figure 3B:
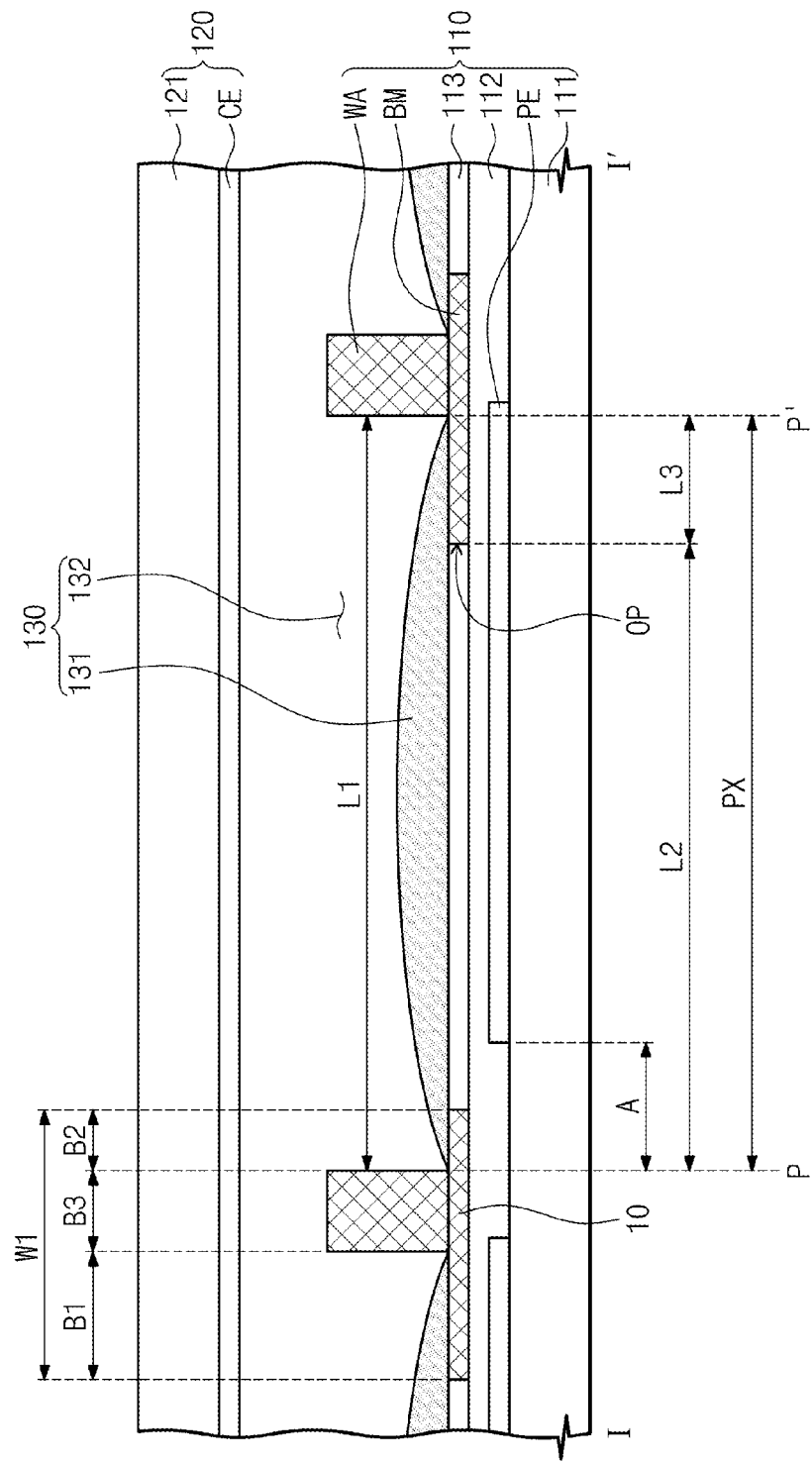
FIG. 3B is a cross-sectional view taken along a line I-I' shown in FIG. 3A.

FIG. 3A is a plan view showing a reset state of a pixel of the electrowetting display device shown in FIG. 1, and FIG. 3B is a cross-sectional view taken along a line I-I' shown in FIG. 3A.

In the present exemplary embodiment, the pixels PXs each have the same configuration and function, and thus hereinafter one pixel PX will be described in detail as a representative example. In FIGS. 3A and 3B, an upper direction of the pixel PX in plan view corresponds to a left direction of the pixel PX in the cross-sectional view, and a lower direction of the pixel PX in the plan view corresponds to a right direction of the pixel PX in the cross-sectional view.

Referring to FIGS. 3A and 3B, a side range of the pixel PX corresponds to an area between two dotted lines P and P' shown in FIG. 3B.

The first fluid 131 and the second fluid 132 are immiscible and make contact with each other, so a boundary exists between the first and second fluids 131 and 132. As shown in FIG. 3B, the first fluid 131 is accommodated in a space defined by adjacent partition walls WA and the second fluid 132 is disposed on the first fluid 131.

The pixel PX partitioned by the partition walls WA includes an area in which the pixel electrode PE is not formed (hereinafter, referred to as a non-pixel electrode area).

When the gray-scale voltage is applied to the pixel PX, the first fluid 131 of the electrowetting layer 130 is gathered in an area including the non-pixel electrode area A of the pixel PX. When the pixel PX is reset, the first fluid 131 is dispersed over the pixel PX again. That is, due to the non-pixel electrode area A, the electrowetting layer 130 moves between the upper and lower directions of the pixel PX (i.e. covering and not covering the pixel electrode area) in the plan view while being operated. This operation of the pixel PX will be described in detail later.

The black matrix BM includes a first extension portion 10 extended in a driving direction (the direction of movement of the fluid 131) of the electrowetting layer 130 and a second extension portion 20 extended in a non-driving direction of the electrowetting layer 130. For instance, when the driving direction of the electrowetting layer 130 is the upper and lower directions of the pixel PX in plan view, the non-driving direction of the electrowetting layer 130 is the left and right direction of the pixel PX in the plan view.

The first extension portion 10 has a first width W1 and the second extension portion 20 has a second width W2. The first width W1 is defined by a width of two openings OPs adjacent to each other in the driving direction of the electrowetting layer 130, and the second width W2 is defined by a width of two openings OPs adjacent to each other in the non-driving direction of the electrowetting layer 130.

In detail, when the driving direction of the pixel PX is the upper and lower directions in plan view, the first width W1 is defined by the width of two openings OPs adjacent to each other in the upper and lower directions, and the second width W2 is defined by the width of two openings OPs adjacent to each other in the left and right directions.

The first width W1 is set greater than the second width W2. The second width W2 is greater than a width of the partition wall WA which corresponds to a width between two pixels PXs adjacent to each other. Although not shown in the figures, the second width W2 may be the same as the width of the partition wall WA. Indeed, each width W1, W2 can take on any suitable value.

The first extension portion 10 extends in the driving direction and includes a first area B1, a second area B2, and a third area B3. The first and second areas B1 and B2 extend in opposite directions to each other and the third area B3 overlaps the partition wall WA.

The second area B2 extends into the area in which the first fluid 131 is gathered or in the non-pixel electrode area when the pixel PX is operated. The first area B1 extends in the opposite direction as that of the second area B2.

In other words, in the case that the driving direction of the electrowetting layer 130 is the upper and lower direction of the pixel PX in the plan view, the second area B2 is extended in the lower direction of the pixel PX in the plan view of FIG. 3A. The first area B1 is extended in the upper direction of the pixel PX in the plan view of FIG. 3A. The third area B3 has the same width as the partition wall WA and overlaps the partition wall WA.

A length of the pixel PX in the driving direction of the electrowetting layer 130 is referred to as a first length L1. The first length L1 includes a second length L2 and a third length L3. The second length L2 indicates a length of the area of the pixel PX which does not overlap the first area B1, and the third length L3 indicates a length of the area of the pixel PX which does overlap the first area B1.

The width of the first area B1 may be smaller than half of the first length L1, and the width of the second area B2 may be smaller than the width of the first area B1.

When the gray-scale voltage is not applied to the pixel electrode PE, the first fluid 131 is dispersed over the pixel PX as shown in FIGS. 3A and 3B. For example, when the pixel electrode PE and the common electrode CE are applied with voltages with the same voltage level, the second fluid 132 is not polarized since no voltage difference exists between the pixel electrode PE and the common electrode CE.

Upper surfaces of the first and second areas B1 and B2 of the black matrix BM may be surface-treated using a hydrophobic material. The first fluid 131 having non-polarity makes contact with the hydrophobic layer 113 having hydrophobicity, as well as the upper surfaces of the first and second areas B1 and B2 of the black matrix BM. Thus, the first fluid 131 may be dispersed over the pixel PX. In addition, since the first fluid 131 absorbs light, the pixel PX displays a black gray scale.

Figure 4A:
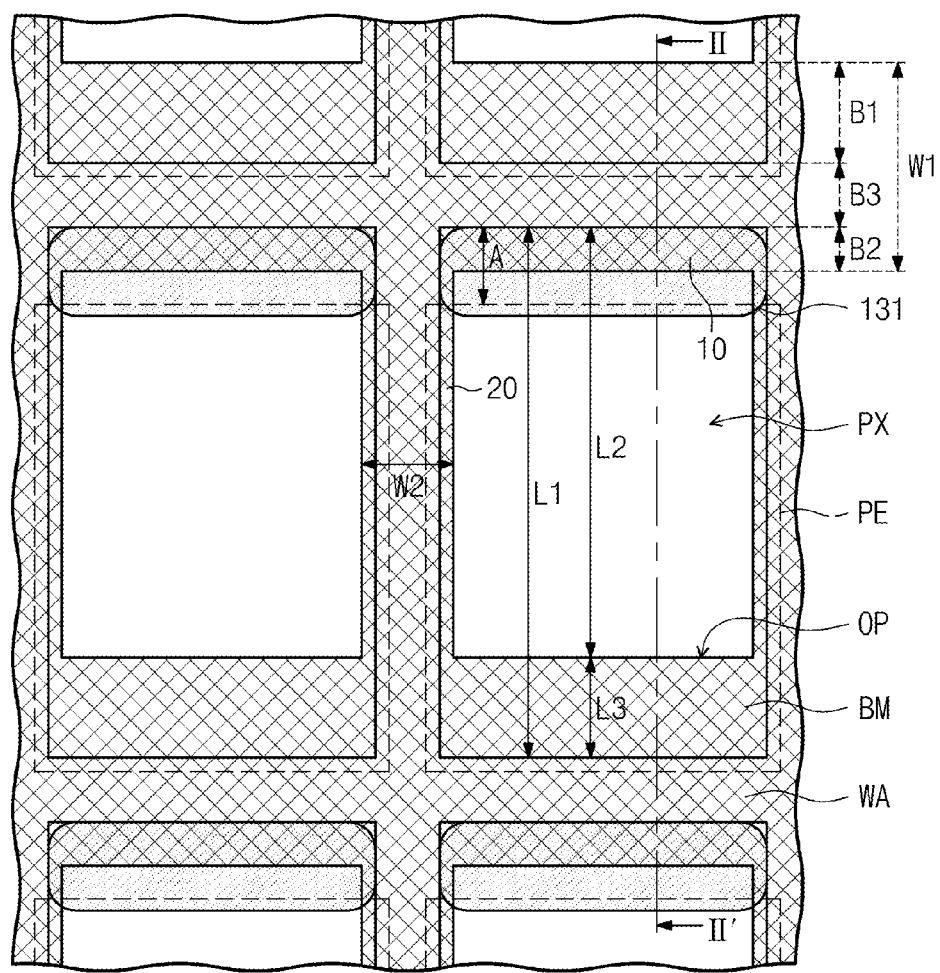
FIG. 4A is a plan view showing a driving state of a pixel of the electrowetting display device shown in FIG. 1.
Figure 4B:
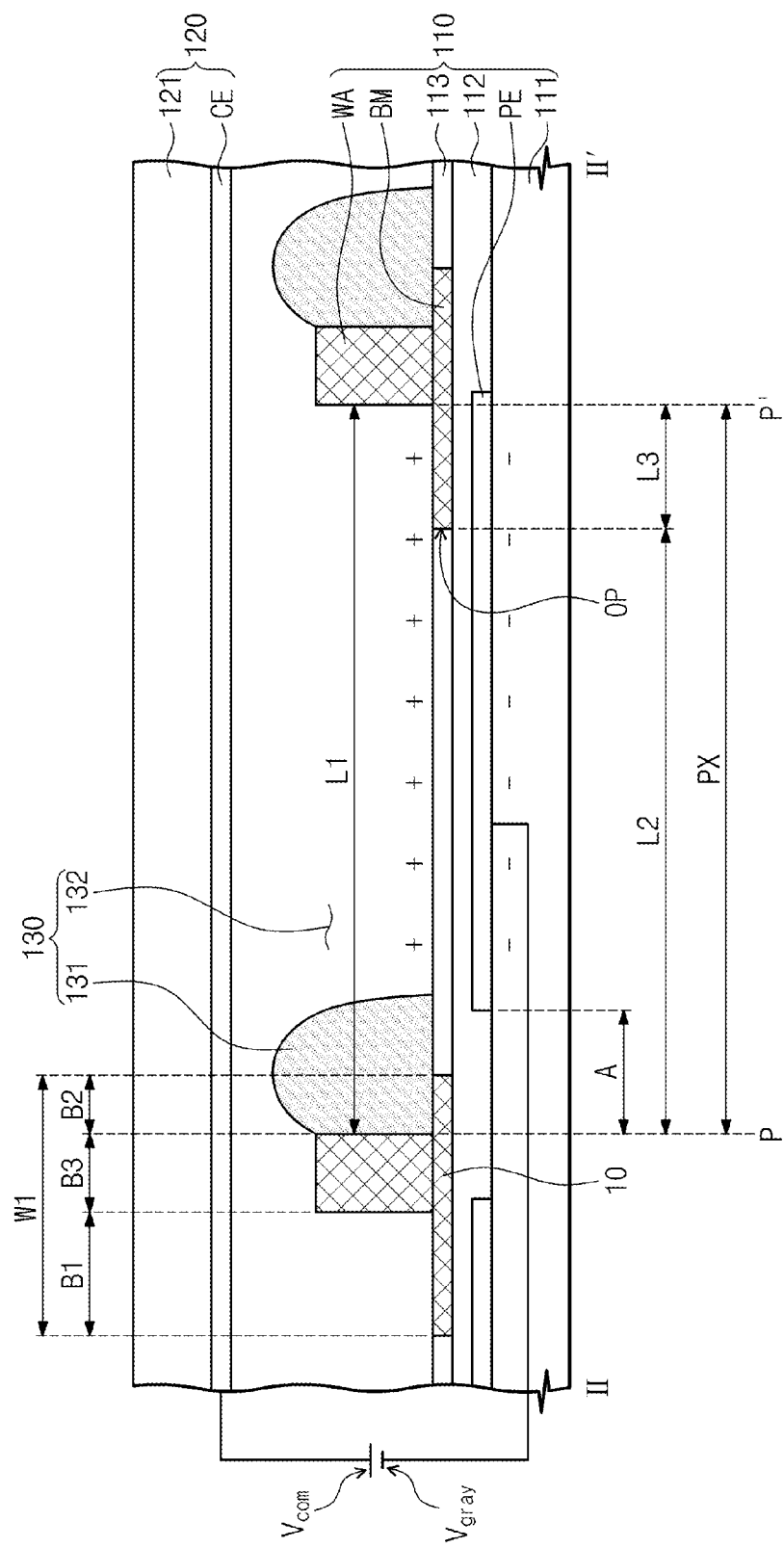
FIG. 4B is a cross-sectional view taken along a line II-II' shown in FIG. 4A.

FIG. 4A is a plan view showing a driving state of a pixel of the electrowetting display device shown in FIG. 1, and FIG. 4B is a cross-sectional view taken along a line II-II' shown in FIG. 4A.

Referring to FIGS. 4A and 4B, the pixel electrode PE is applied with the gray-scale voltage Vgray and the common electrode CE is applied with the common voltage Vcom. In detail, the gray-scale voltage Vgray applied to the pixel electrode PE has a voltage level lower than that of the common voltage Vcom. In this, case, the common voltage Vcom is a positive voltage and the gray-scale voltage Vgray is a negative voltage.

The second fluid 132 is polarized by the level difference between the common voltage Vcom and the gray-scale voltage Vgray. For instance, as shown in FIG. 4B, the pixel electrode PE has negative polarity and an area of the second fluid 132, which is adjacent to the pixel electrode PE, has positive polarity. An attractive force acts between the pixel electrode PE having negative polarity and the area of the second fluid, which is adjacent to the pixel electrode PE and has positive polarity. Thus, a surface tension of the polarized second fluid 132 is changed, so that the second fluid 132 makes contact with the hydrophobic layer 113 overlapped with the pixel electrode EP and the upper surface of the first area B1 of the black matrix BM. As a result, the first fluid 131 is pushed out to a side portion of the pixel PX by the second fluid 132.

The first fluid 131 includes an organic solvent, and tends to gather. Accordingly, the first fluid 131 is pushed out to the side portion of the pixel PX by the second fluid 132 and stably gathered in the side portion of the pixel PX.

For instance, since the pixel electrode PX is not formed in the non-pixel electrode area A, the gray-scale voltage Vgray is not applied to the non-pixel electrode area A, and therefore an electric field is not generated in the non-pixel electrode area A. As a result, the first fluid 131 gathers in the side portion of the pixel PX, which includes the non-pixel electrode area A. That is, as shown in FIG. 4A, the first fluid 131 gathers at the upper portion of the pixel PX. In addition, as shown in FIG. 4B, the first fluid 131 may be gathered to the left portion of the pixel PX. In this case, the light transmits through the second fluid 132, so that the pixel PX displays a predetermined image.

As described above, the second area B2 of the black matrix BM extends into the area in which the first fluid 131 is gathered. Accordingly, the second area B2 overlaps with the area in which the first fluid 131 is gathered.

In detail, as shown in FIG. 4B, the second area B2 of the black matrix BM overlaps with a predetermined area in which the first fluid 131 gathers. Although not shown in the figures, in the case that the width of the second area B2 is smaller than the width of the first area B1, the second area B2 may overlap the entire area in which the fluid 131 is gathered.

Ideally, the first fluid 131 has a light blocking rate of 100%, but the light blocking rate of the first fluid 131 may not be 100%. Accordingly, a portion of the light incident to the first substrate 110 may transmit through the first fluid 131 gathered in the non-pixel electrode area A. Since the second area B2 of the black matrix BM overlaps with the area in which the first fluid 131 is gathered, the second area B2 of the black matrix BM may serve as a shutter to at least partially block the light passing through the first fluid 131.

The amount of the first fluid 131 pushed into non-pixel electrode area A depends on the level difference between the gray-scale voltage Vgray applied to the pixel electrode PE and the common voltage Vcom applied to the common electrode CE. For example, as the level difference between the common voltage CE and the gray-scale voltage Vgray increases, the amount of the first fluid 131 gathered in the non-pixel electrode area A increases. The common voltage CE has a constant level and the gray-scale voltage Vgray has a level corresponding to the gray-scale displayed in the pixel PX. Thus, the pushed-out amount of the first fluid 131 may be decided by the level of the gray-scale voltage Vgray applied to the pixel electrode 112.

The first fluid 131 pushed out to the side portion of the pixel PX has a height greater than a height of the partition wall WA as shown in FIG. 4B. A side surface of the partition wall WA is surface-treated to have hydrophilicity, and an upper surface of the partition wall WA is surface-treated to have hydrophobicity. Thus, the first fluid 131 has a chemical affinity to the side surface of the partition wall WA, which is higher than a chemical affinity to the upper surface of the partition wall WA. As a result, although the first fluid 131 has the height higher than that of the partition wall WA, the first fluid 131 may be prevented from moving to adjacent pixel beyond the partition wall WA.

Figure 5A:
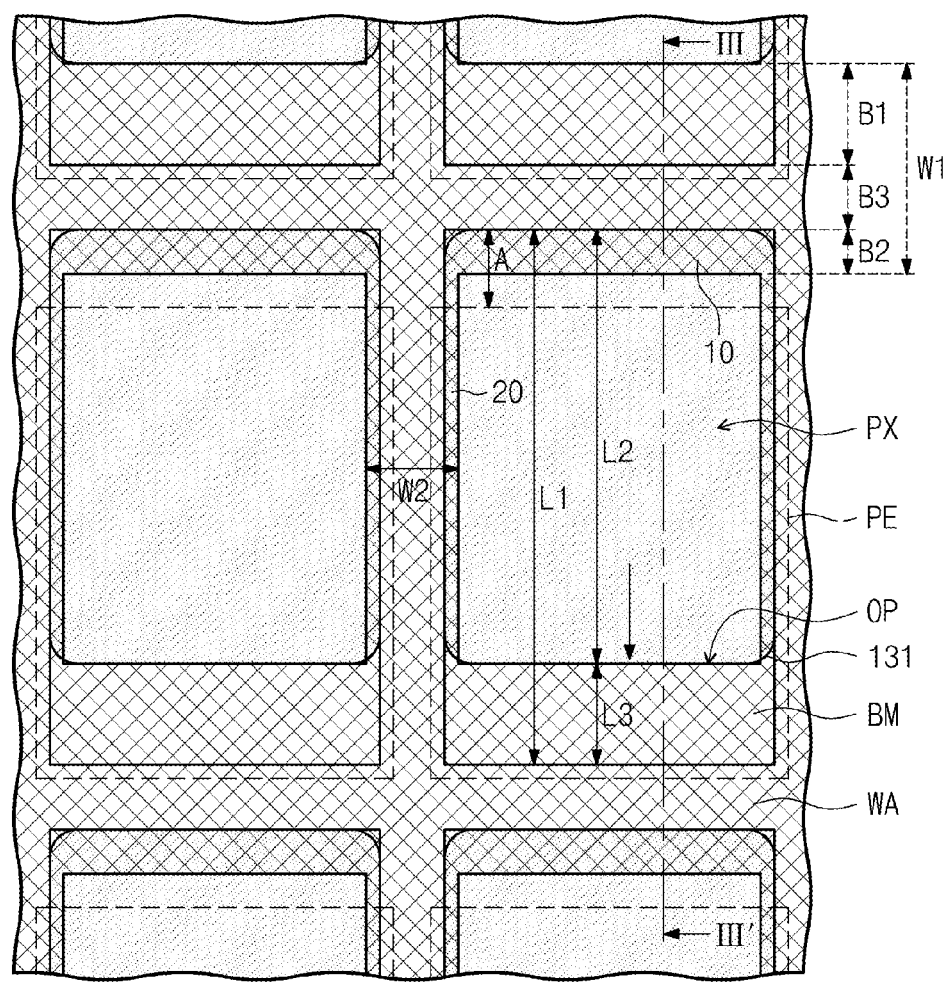
FIG. 5A is a plan view showing a movement of an electrowetting layer of a pixel in a reset state.
Figure 5B:
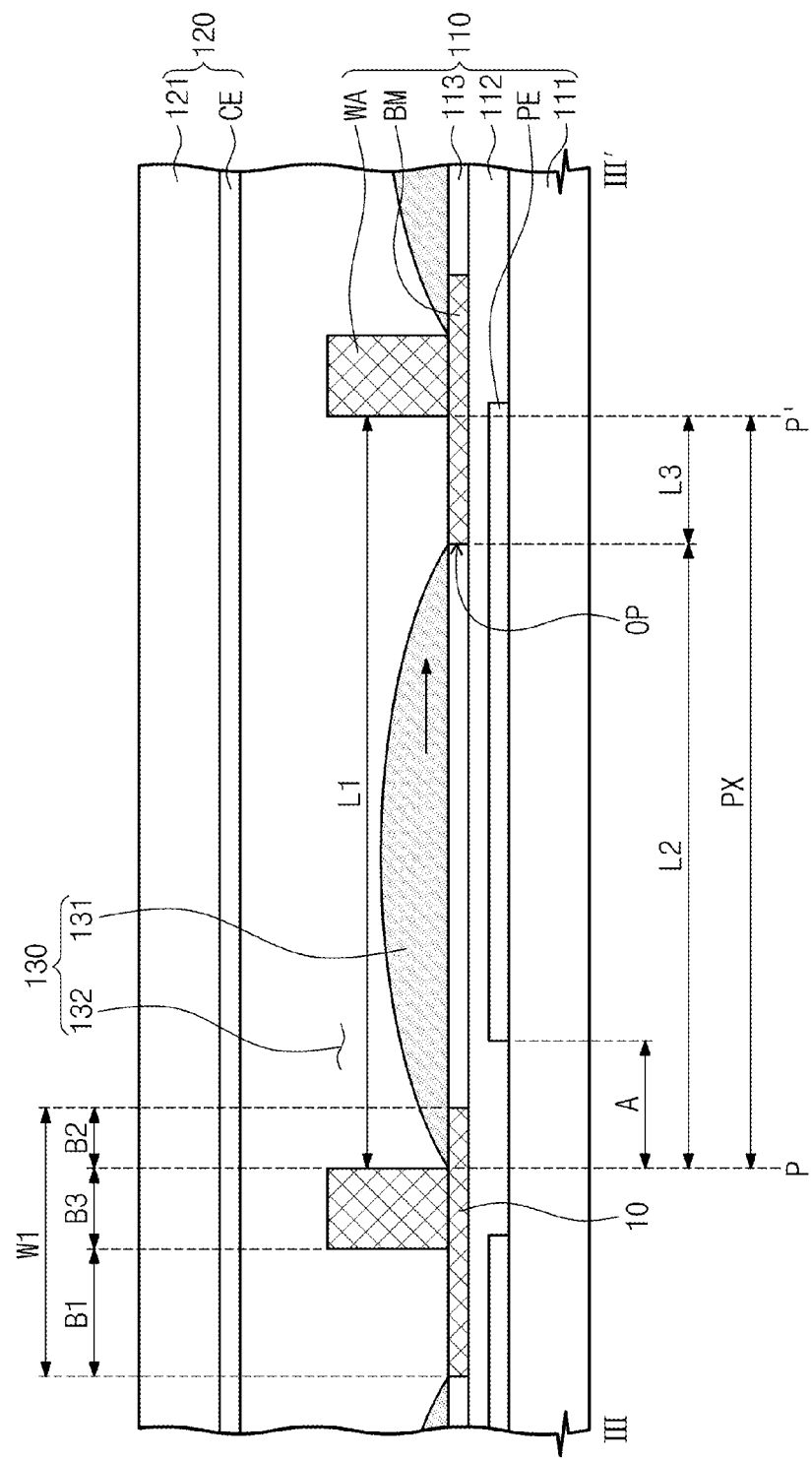
FIG. 5B is a cross-sectional view taken along a line III-III' shown in FIG. 5A.

FIG. 5A is a plan view showing a movement of an electrowetting layer of a pixel in a reset state, and FIG. 5B is a cross-sectional view taken along a line III-III' shown in FIG. 5A.

Referring to FIGS. 5A and 5B, the first fluid 131 gathered in the non-pixel electrode area A is dispersed over the pixel PX when the pixel PX is reset. For instance, the first fluid 131 gathered in the non-pixel electrode area A moves to the lower direction of the pixel PX in the plan view shown in FIG. 5A when the pixel PX is reset. In addition, the first fluid 131 gathered in the non-pixel electrode area A moves to the right direction of the pixel PX in the cross-sectional view shown in FIG. 5B when the pixel PX is reset.

When the pixel PX is reset, the moving speed of the first fluid 131 may not be uniform in the pixel PX. In detail, the second length L2 has a length corresponding to approximately seven-tenths of the first length L1, and the third length L3 has a length corresponding to approximately three-tenths of the first length L1. When an average speed of the first fluid 131 moving through the plan area of the pixel PX corresponding to the second length L2 is referred to as a first speed, and an average speed of the first fluid 131 moving through the plan area of the pixel PX corresponding to the third length L3 is referred to as a second speed, the first speed may be faster than the second speed. The operation time of the pixel PX corresponds to a sum of a time required to display a predetermined gray scale and a time required to display the black gray-scale.

In a case that the first fluid 131 moves to the boundary surface of the first area B1 of the black matrix BM, the light incident to the area of the pixel PX, which corresponds to the first area B1, is blocked by the black matrix BM. In detail, the black matrix BM extends through the third length L3 and the first fluid 131 moves through the plan area of the pixel PX corresponding to the second length L2 at the first speed. In this case, the light provided to the plan areas of the pixel PX, which corresponds to the third length L3, is blocked by the first area B1 of the black matrix BM. Accordingly, the pixel PX may display the black gray-scale before the first fluid 131 is dispersed over the pixel PX.

The first fluid 131 may move through the plan area of the pixel PX, which corresponds to the third length L3, at the second speed slower than the first speed. The light is blocked by the first area B1 of the black matrix BM while the first fluid 131 moves at the second speed. Accordingly, the operation time of the pixel PX may be reduced to only the time during which the first fluid 131 moves along the second length L2 at the first speed, rather than the time during which the first fluid 131 moves across the entire surface of the pixel PX. When the operation time of the pixel PX is reduced, the driving speed of the pixel PX may be improved.

Consequently, the electrowetting display device 100 according to the first exemplary embodiment may improve the driving speed of the pixel PX.

As described above, the first extension portion 10 of the black matrix BM includes the first area B1 extended in the upper direction of the pixel PX in the plan view, and the second area B2 extended in the lower direction of the pixel PX in the plan view, but the black matrix BM should not be limited thereto or thereby. For instance, in the case that the driving direction of the electrowetting layer 130 is the left and right directions of the pixel PX in the plan view, the second extension portion 20 of the black matrix BM includes first and second areas B1 and B2 respectively extended in the left and right directions of the pixel PX in the plan view.

In addition, the driving direction of the electrowetting layer 130 may be a diagonal direction. For example, the non-pixel electrode area A may be disposed at one corner of a rectangular pixel PX. Therefore, the first fluid 131 gathers in the corner at which the non-pixel electrode area A is formed. In this case, the black matrix BM includes a second area B2 partially overlapping the area in which the first fluid 131 is gathered, and a first area B1 extended opposite to the second area B2 along the diagonal direction.

Figure 6:
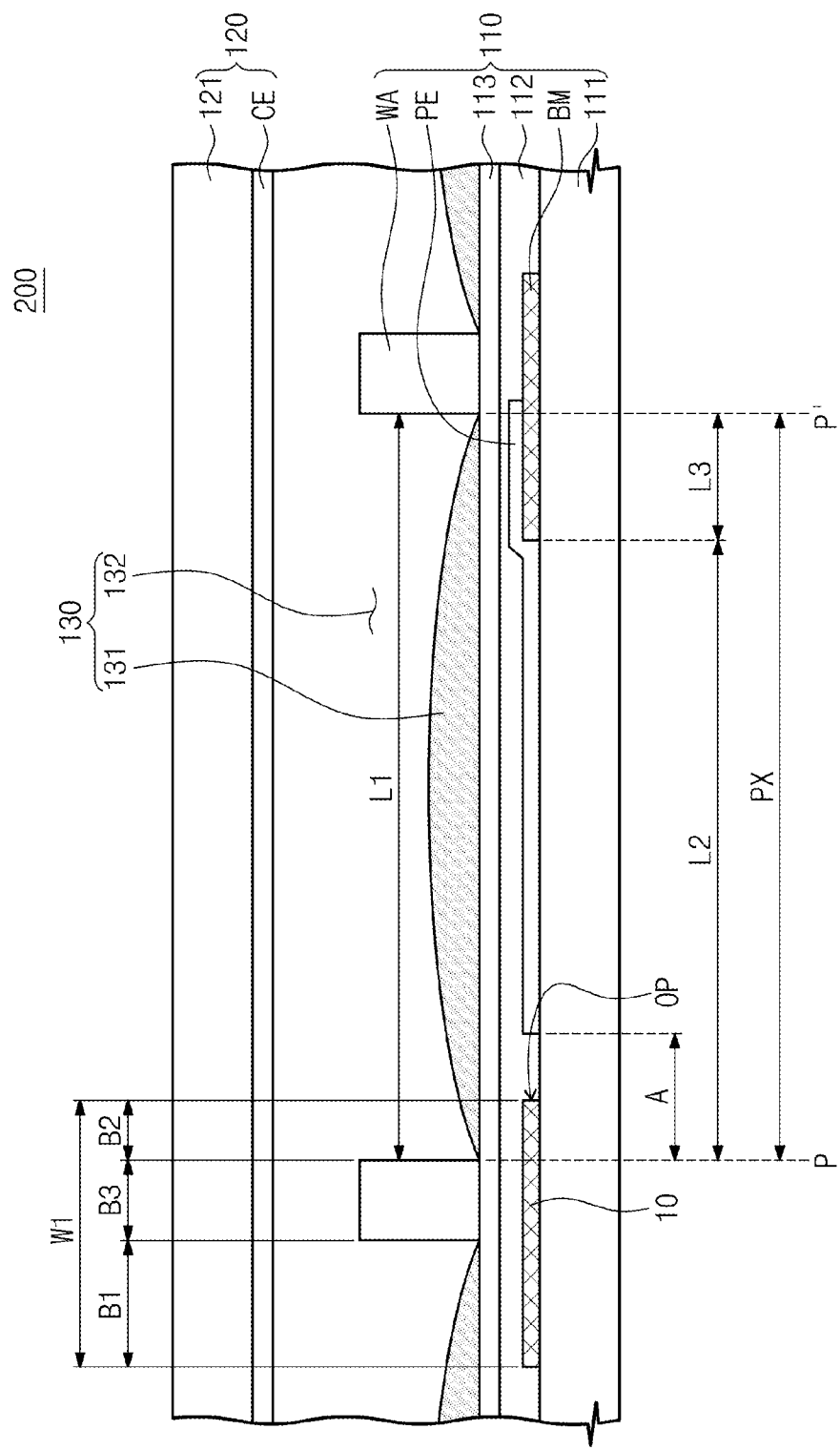
FIG. 6 is a cross-sectional view showing an electrowetting display device according to a second exemplary embodiment of the present invention.

FIG. 6 is a cross-sectional view showing an electrowetting display device according to a second exemplary embodiment of the present invention.

The electrowetting display device 200 according to the second exemplary embodiment has the same structure and function as those of the electrowetting display device 100 shown in FIG. 1 according to the first exemplary embodiment, except for the first substrate 110. In FIG. 6, the same reference numerals denote the same elements in FIGS. 1 to 5A and 5B, and thus detailed descriptions of the same elements will be omitted.

Referring to FIG. 6, a black matrix BM and a pixel electrode PE are disposed on a first base substrate 111 of the first substrate 110.

The black matrix BM has substantially the same configuration as the black matrix shown in FIG. 3A. For instance, the black matrix BM includes a first extension portion 10 and a second extension portion (not shown). The first extension portion 10 includes a first area B1, a second area B2, and a third area B3.

A portion of the black matrix BM overlaps, and makes contact with, a portion of the pixel electrode PE. The portion of the black matrix B which overlaps the portion of the pixel electrode PE includes a portion of the first area B1 and the third area B3 as shown in FIG. 6. The upper surface of the black matrix BM makes contact with the lower surface of the pixel electrode PE in the area of overlap, but embodiments of the invention are not limited thereto or thereby. That is, for example, the upper surface of the pixel electrode PE may make contact with the lower surface of the black matrix BM in the overlapped area.

An insulating layer 112 is disposed on the first base substrate 111 to cover the black matrix BM and the pixel electrode PE. A hydrophobic layer 113 is disposed on the insulating layer 112.

A partition wall WA is disposed on the hydrophobic layer 113 to partition pixels PXs. The partition wall WA is formed of photoresist or by patterning an insulating layer, e.g., silicon nitride (SiNx), silicon oxide (SiOx), etc. Different from the electrowetting display device 100 according to the first exemplary embodiment, the partition wall WA of the electrowetting display device 200 according to the second exemplary embodiment does not have a black color.

Hereinafter, the second substrate 120 and the electrowetting layer 130 have the same structure and function as those of the electrowetting display device 100 according to the first exemplary embodiment, and thus detailed descriptions of the second substrate 120 and the electrowetting layer 130 will be omitted.

When the pixel electrode PE is applied with a gray-scale voltage and the common electrode CE is applied with a common voltage, the second fluid 132 of the electrowetting layer 130 is polarized. The polarized second fluid 132 makes contact with the hydrophobic layer 113 to push out the first fluid 131 to a side portion of the pixel PX. Accordingly, the first fluid 131 may be gathered in an area of the pixel PX which includes the non-pixel electrode area A.

When the pixel PX is reset, the first fluid 131 makes contact with the hydrophobic layer 113 so as to be dispersed over the pixel PX. Since the operation of the pixel PX has been described already, details thereof will be omitted.

When the pixel PX is reset, the first fluid 131 moves to the boundary surface of the first area B1 of the black matrix BM. In this case, the light incident to the area of the pixel PX, which corresponds to the first area B1, is blocked by first area B1 of the black matrix BM.

When the gray-scale voltage is applied to the pixel PX, the second area B2 of the black matrix BM blocks the light passing through the first fluid 131 gathered in the side portion of the pixel PX.

Consequently, the electrowetting display device 100 according to the second exemplary embodiment may improve the driving speed of the pixel PX.

Figure 7:
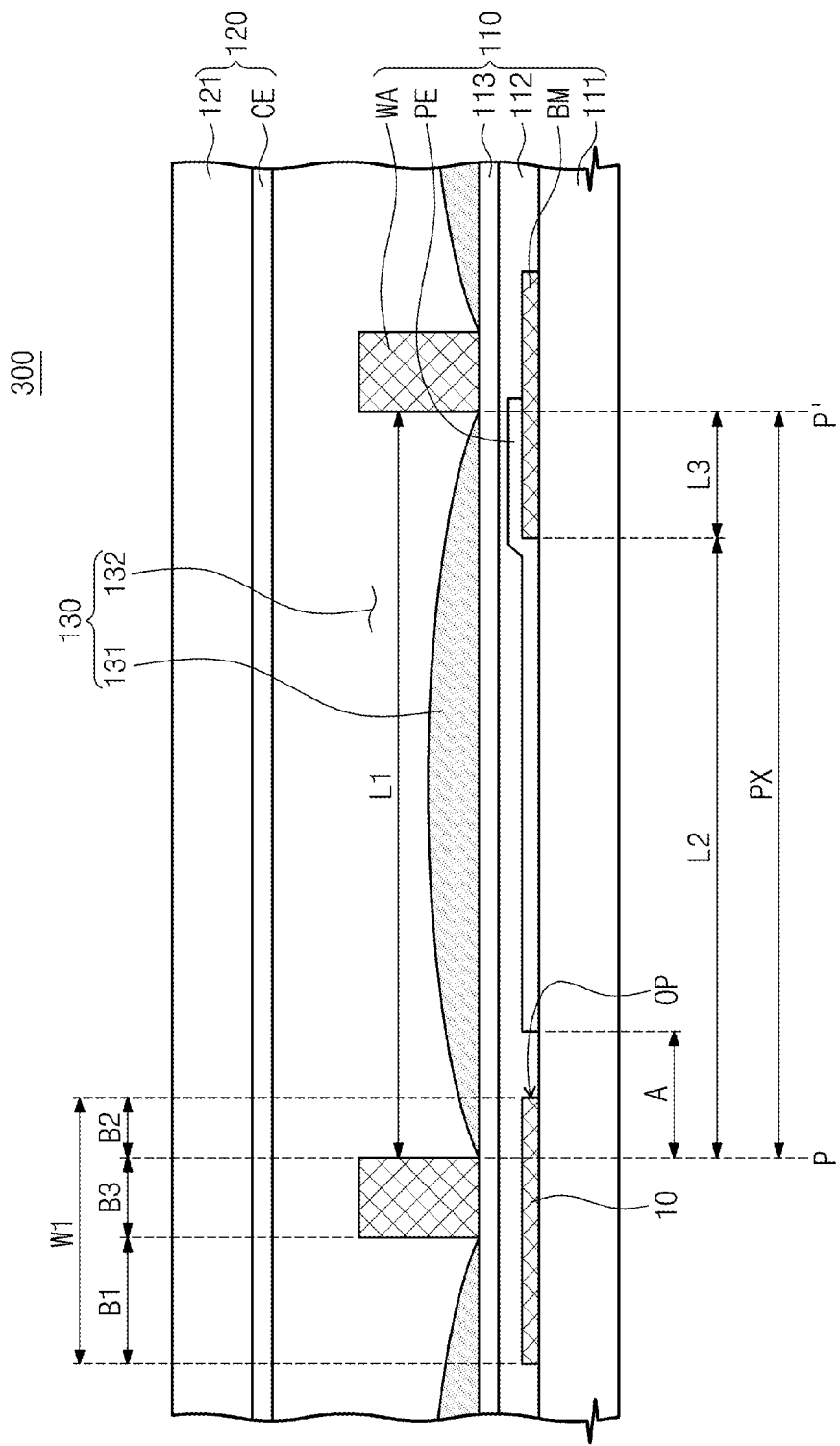
FIG. 7 is a cross-sectional view showing an electrowetting display device according to a third exemplary embodiment of the present invention.

FIG. 7 is a cross-sectional view showing an electrowetting display device according to a third exemplary embodiment of the present invention.

The electrowetting display device 300 according to the third exemplary embodiment has the same structure and function as those of the electrowetting display device 200 shown in FIG. 6 according to the second exemplary embodiment, except for the partition wall WA. In FIG. 7, the same reference numerals denote the same elements in FIG. 6, and thus detailed descriptions of the same elements will be omitted.

Referring to FIG. 7, the partition wall WA that partitions the pixels PXs is disposed on the hydrophobic layer 113. The partition wall WA is formed of the same material as the black matrix BM, and has a black color. In detail, the partition wall WA and the black matrix BM are formed of an organic material and have a black color.

The black matrix BM has a substantially similar configuration as the black matrix BM shown in FIG. 6, and the other elements of the electrowetting display device 300 according to the third exemplary embodiment have substantially the same configuration as the electrowetting display device 200 according to the second exemplary embodiment, and thus details thereof will be omitted.

Due to the configuration of the black matrix BM, the electrowetting display device 300 according to the third exemplary embodiment may improve the driving speed of the pixel PX.

Figure 8:
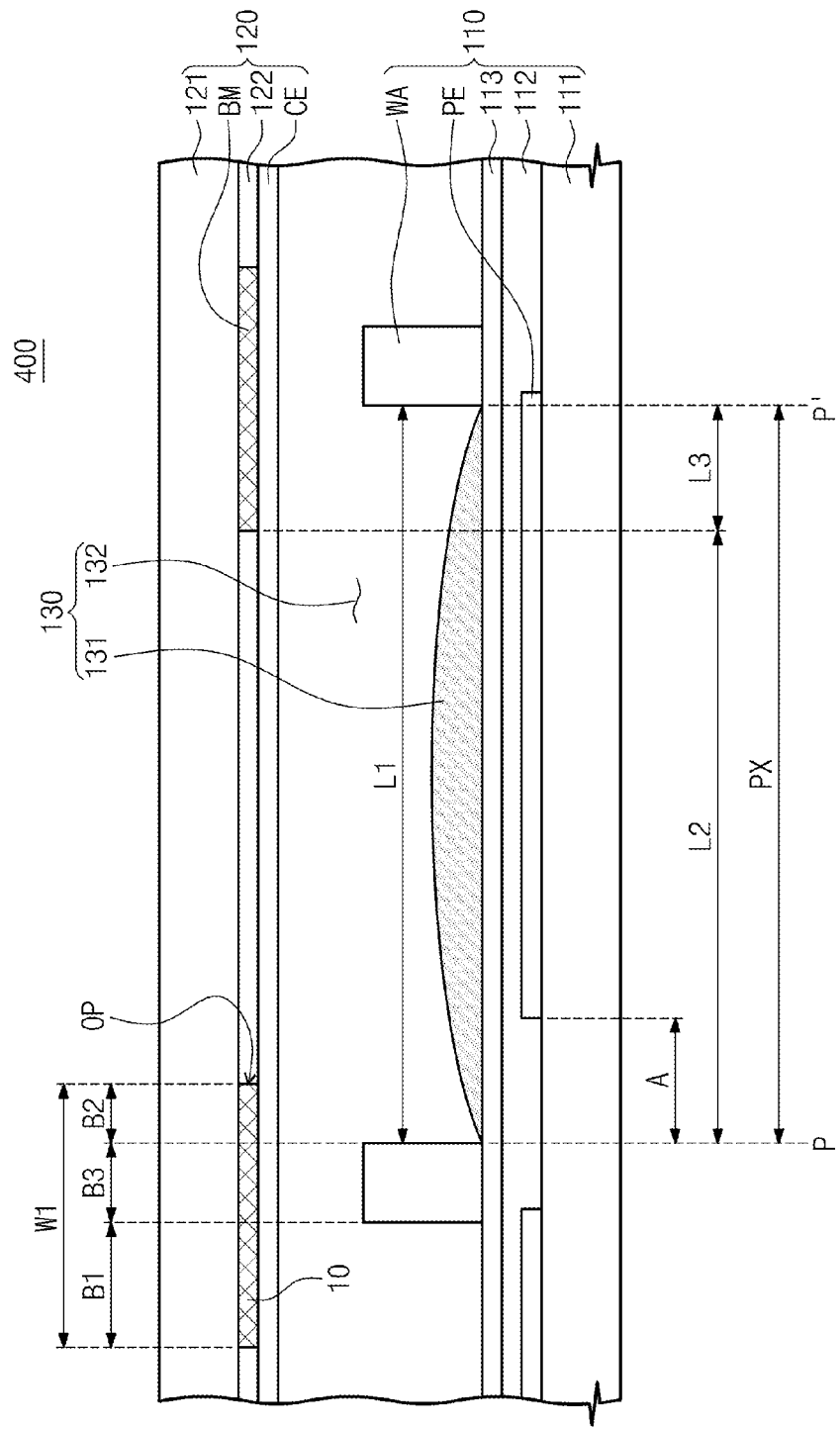
FIG. 8 is a cross-sectional view showing an electrowetting display device according to a fourth exemplary embodiment of the present invention.

FIG. 8 is a cross-sectional view showing an electrowetting display device according to a fourth exemplary embodiment of the present invention.

The electrowetting display device 400 according to the fourth exemplary embodiment has the same structure and function as those of the electrowetting display device 200 shown in FIG. 6 according to the second exemplary embodiment, except that the black matrix BM is formed on the second substrate rather than the first substrate. In FIG. 8, the same reference numerals denote the same elements in FIG. 6, and thus detailed descriptions of the same elements will be omitted.

Referring to FIG. 8, the second substrate 120 includes a second base substrate 121, a black matrix BM and a planarization layer 122 each disposed on the second base substrate 121, and a common electrode CE disposed on the black matrix BM and the planarization layer 122.

The black matrix BM includes a plurality of openings formed therethrough, and the planarization layer 122 is disposed in the openings. FIG. 8 shows one opening OP formed through the black matrix BM, with the planarization layer 122 being disposed in the opening OP.

The planarization layer 122 has a height equal to a height of the black matrix BM. Accordingly, the common electrode CE may have a flat surface as shown in FIG. 8.

The black matrix BM has a substantially similar configuration as that of the black matrix BM shown in FIG. 6. That is, the black matrix BM includes the first extension portion 10 and the second extension portion (not shown). The first extension portion 10 includes the first area B1, the second area B2, and the third area B3.

The first substrate 110 of the electrowettting display device 400 has substantially the same configuration as the first substrate 110 shown in FIG. 6, except that the first substrate 110 does not include the black matrix BM. In addition, the electrowetting layer 130 of the electrowetting display device 400 has a substantially similar configuration as that of the electrowetting layer 130 shown in FIG. 6. Thus, detailed descriptions of the first substrate 110 and the electrowetting layer 130 will be omitted.

When the pixel electrode PE is applied with a gray-scale voltage and the common electrode CE is applied with a common voltage, the second fluid 132 of the electrowetting layer 130 is polarized. The polarized second fluid 132 makes contact with the hydrophobic layer 113 to push out the first fluid 131 to a side portion of the pixel PX. Accordingly, the first fluid 131 gathers in an area of the pixel PX which includes the non-pixel electrode area A. When the pixel PX is reset, the first fluid 131 makes contact with the hydrophobic layer 113 so as to be dispersed over the pixel PX. Since the operation of the pixel PX has been described already, details thereof will be omitted.

When the pixel PX is reset, the first fluid 131 moves to the boundary surface of the first area B1 of the black matrix BM. In this case, the light incident to the area of the pixel PX, which corresponds to the first area B1, is blocked by first area B1 of the black matrix BM.

When the gray-scale voltage is applied to the pixel PX, the second area B2 of the black matrix BM blocks the light passing through the first fluid 131 gathered in the side portion of the pixel PX.

Consequently, the electrowetting display device 100 according to the fourth exemplary embodiment may improve the driving speed of the pixel PX.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An electrowetting display device comprising:
a first base substrate that includes a plurality of pixels;
a second base substrate that faces the first base substrate and includes a common electrode;
an electrowetting layer disposed between the first base substrate and the second base substrate;
a plurality of pixel electrodes disposed on the first base substrate to respectively correspond to the pixels;
a black matrix that includes a plurality of openings corresponding to respective ones of the pixels, the black matrix having a first extension portion extending in a driving direction of the electrowetting layer, the driving direction being a direction in which motion of the electrowetting layer is induced when a voltage difference is applied between the common electrode and the corresponding pixel electrode, and extending in a second direction substantially perpendicular to the driving direction; and
a partition wall that partitions the pixels, wherein the first extension portion comprises a first area, a second area, and a third area, the first area and the second area respectively extending in opposite directions to each other, and wherein the third area has a width substantially the same as a width of the partition wall, the first area has a width less than about half of a first length corresponding to a length extending between both sides of each pixel in the driving direction of the electrowetting layer, and the second area has a width less than the width of the first area.

2. The electrowetting display device of claim 1, wherein the black matrix further comprises a second extension portion extending between adjacent ones of the first extension portions, and wherein the first extension portion has a width greater than a width of the second extension portion.

3. The electrowetting display device of claim 2, wherein the width of the second extension portion is equal to or greater than the width of the partition wall.

4. The electrowetting display device of claim 1, wherein the third area overlaps the partition wall.

5. The electrowetting display device of claim 1, wherein the partition wall is disposed on the black matrix.

6. The electrowetting display device of claim 5, wherein the partition wall comprises a same material as the black matrix and has a black color.

7. The electrowetting display device of claim 1, further comprising:
an insulating layer disposed on the first base substrate to cover the pixel electrodes; and
a hydrophobic layer disposed in the openings, wherein the black matrix and the hydrophobic layer are both disposed on the insulating layer.

8. The electrowetting display device of claim 7, wherein the electrowetting layer comprises:
a first fluid that has electrical non-conductivity or non-polarity; and
a second fluid immiscible with the first fluid and having an electrical conductivity or a polarity, wherein the first fluid is accommodated in a space defined by the partition wall, and the second fluid is disposed on the first fluid.

9. The electrowetting display device of claim 8, wherein when a common voltage is applied to the common electrode and one or more gray-scale voltages are applied to the pixel electrodes, the second fluid contacts the hydrophobic layer and the first areas so as to push the first fluid to a side portion of the pixels.

10. The electrowetting display device of claim 9, wherein the second areas extends under areas in which the first fluid is gathered, so as to overlap the first fluid.

11. The electrowetting display device of claim 1, wherein the width of the first area is equal to or greater than about three-tenths of the first length.

12. The electrowetting display device of claim 1, further comprising:
an insulating layer disposed on the first base substrate to cover the black matrix and the pixel electrodes; and
a hydrophobic layer disposed on the insulating layer, wherein the black matrix is disposed on the first base substrate, the partition wall is disposed on the hydrophobic layer, and the first area overlaps a predetermined area of the pixel electrode to make contact with the pixel electrode.

13. The electrowetting display device of claim 12, wherein the partition wall has a black color.

14. An electrowetting display device comprising:
a first base substrate that includes a plurality of pixels;
a second base substrate that faces the first base substrate and includes a common electrode;
an electrowetting layer disposed between the first base substrate and the second base substrate;
a plurality of pixel electrodes disposed on the first base substrate to respectively correspond to the pixels;
a black matrix disposed between the common electrode and the second base substrate and including a plurality of openings corresponding to respective ones of the pixels, the black matrix having a first extension portion extending in a driving direction of the electrowetting layer, the driving direction being a direction in which motion of the electrowetting layer is induced when a voltage difference is applied between the common electrode and the corresponding pixel electrode, and extending in a second direction substantially perpendicular to the driving direction; and
a partition wall that partitions the pixels, wherein the first extension portion comprises a first area, a second area, and a third area, the first area and the second area respectively extending in opposite directions to each other, and wherein the third area has a width substantially the same as a width of the partition wall, the first area has a width less than about half of a first length corresponding to a length extending between both sides of each pixel in the driving direction of the electrowetting layer, and the second area has a width less than the width of the first area.

15. The electrowetting display device of claim 14, wherein the black matrix further comprises a second extension portion extending between adjacent ones of the first extension portions, and wherein the first extension portion has a width greater than a width of the second extension portion and the third area of the first extension portion is overlapped with the partition wall.

16. The electrowetting display device of claim 14, further comprising:
an insulating layer disposed on the first base substrate to cover the pixel electrodes; and
a hydrophobic layer disposed on the insulating layer, wherein the partition wall is disposed on the hydrophobic layer.

17. The electrowetting display device of claim 16, wherein the electrowetting layer comprises:
a first fluid that has electrical non-conductivity or non-polarity; and
a second fluid immiscible with the first fluid and having an electrical conductivity or a polarity, wherein the first fluid is accommodated in a space defined by the partition wall, and the second fluid is disposed on the first fluid.

18. The electrowetting display device of claim 17, wherein when a common voltage is applied to the common electrode and one or more gray-scale voltages are applied to the pixel electrodes, the second fluid contacts the hydrophobic layer so as to push the first fluid to a side portion of the pixels.

19. The electrowetting display device of claim 18, wherein the second areas extends under areas in which the first fluid is gathered, so as to overlap the first fluid.

20. The electrowetting display device of claim 14, wherein the width of the first area is equal to or greater than about three-tenths of the first length.

* * * * *